No. 630,177. Patented Aug. 1, 1899.
D. BUCHANAN.
POTATO DIGGER.
(Application filed Apr. 28, 1899.)

(No Model.)

Witnesses:
L. C. Hills.
John Chalmers Wilson

Inventor:
David Buchanan,
By Thel Bussey & Forbes
Attys.

THE NORRIS PETERS CO., PHOTO-LITHO., WASHINGTON, D. C.

United States Patent Office.

DAVID BUCHANAN, OF AUBURN, VICTORIA.

POTATO-DIGGER.

SPECIFICATION forming part of Letters Patent No. 630,177, dated August 1, 1899.

Application filed April 28, 1899. Serial No. 714,888. (No model.)

*To all whom it may concern:*

Be it known that I, DAVID BUCHANAN, a subject of the Queen of the United Kingdom of Great Britain and Ireland, residing at Auburn, in the Colony of Victoria, have invented certain new and useful Improvements in Potato-Diggers; and I do hereby declare the following to be a full, clear, and exact description of the invention, such as will enable others skilled in the art to which it appertains to make and use the same.

This invention relates to machines for digging potatoes or other like root crops and cleaning, bagging, or laying the said potatoes or the like in rows or heaps, as desired. The machine is characterized by having an adjustable inclined curved screen or riddle, at the front of which is a soil-cutting edge or share and within which is an elevating-screw or carrier which has an incurved rounded entering edge and which revolves automatically as the machine is drawn forward. It has also all parts requiring to be adjusted during the progress of the machine in the field accessible to the driver without requiring the latter to leave his seat—that is to say, the screw can be started or stopped, the machine-front can be raised or lowered to adjust the depth of cut, and the potatoes can be tipped out at will when any desired quantity has been raised and accumulated in the receptacle provided for the purpose. In combination with these features are various parts which will be fully understood by reference to the accompanying drawings and the explanations below.

Figure 1:
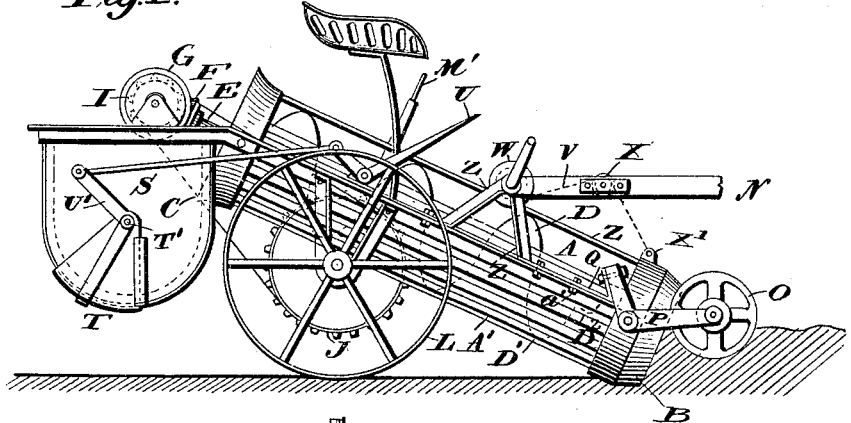
Figure 2:
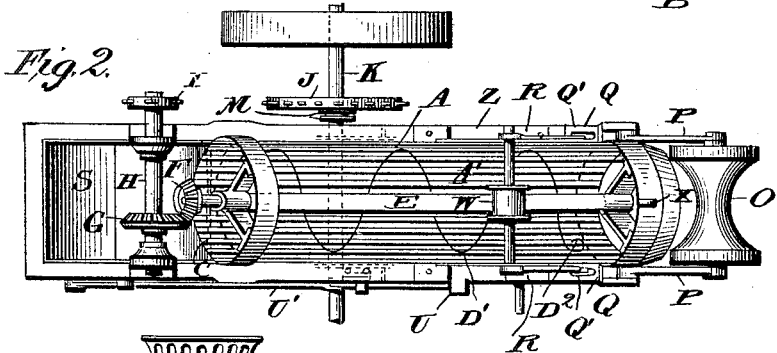
Figure 3:
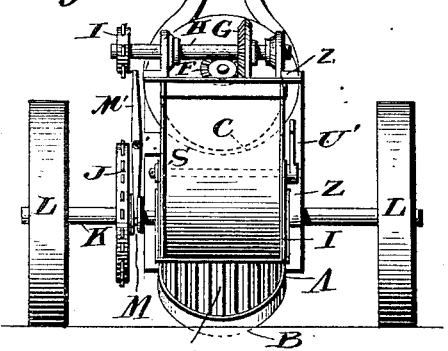
Figure 4:
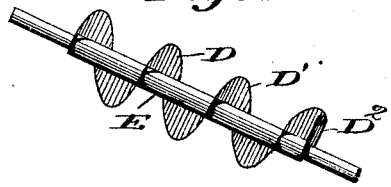

In the drawings, Figure 1 exhibits a side elevation of my machine. Fig. 2 represents a plan view of parts thereof. Fig. 3 exhibits a rear elevation of various parts, and Fig. 4 shows an elevating-screw alone.

In the drawings, A represents an inclined adjustable riddle having at its low front end a mouth with a share or cutting edge B of any suitable form. The upper rear aperture of the riddle has any suitable discharge edge C. Inside of this riddle, which has the sectional form of an arc of a circle, is a screw D upon a spindle E, supported upon any suitable bearings. By means of bevel-wheel F gearing into bevel-wheel G on a transverse shaft H, carrying a small sprocket-wheel I, connected by a chain with a larger sprocket-wheel J, loosely mounted upon the axle K of the traction-wheels L of the machine, the drawing of the machine forward by any animal yoked to the pole N will cause the screw D to rotate automatically and act as an elevator. There is a clutch M, operated by handle M', one part of which is upon shaft or axle K and engages with the other part upon the larger sprocket-wheel J to work screw D. The cutting-mouth B of the riddle is bolted on, to be replaced when worn, and is regulated to work at a sufficient depth below the surface of the ground to go underneath the potatoes or other like roots, and to maintain the depth desired there is provided at the front a roller O, the axle of which is swung on the fore ends of cranked levers P, each of which is secured in position by a bracket Q, bolted to the respective lever P. Each bracket Q can be moved backward or forward and is fastened (as by a bolt Q', passing through a slot in the bracket and through a hole in the frame of the machine, various parts of which frame are marked Z) in any position to suit the depth required. The earth-line exterior to the machine when at work is shown.

When the machine is in use, the soil and potatoes are forced to enter into the open mouth of the riddle, and the screw, which presents an incurved rounded surface $D^2$ at the entering end, so as not to cut or bruise the potatoes or roots, pushes the latter up the inclined riddle with a motion which causes the soil during the ascent to be separated and dropped through the spaces between the bars A' of the riddle. The edge D' of the screw-blade passes sufficiently close to the bars of the riddle to cut up the weeds and the tops or halms of the potato-plants, which also fall between the said bars, together with the soil. The speed of the screw is so arranged that it will carry up the potatoes, &c., at a comparatively rapid rate—*i. e.*, rather faster than the machine travels forward—so that the material cannot accumulate and choke the screw. The potatoes may be delivered into a removable box S, which has a movable door or bottom T. By keeping the said bottom open the potatoes raised will be caused to fall in rows, or after allowing the box to fill to any desired degree the driver may open it with a lever U, which is operated by hand or foot and has suitable connections U' with said door T. This will let the potatoes fall out into a heap.

The design of the box S may be varied at will. Instead of using a box, bags or other receptacles may be attached in any known way for the reception of the potatoes direct from the discharge C.

To raise the front of this machine out of the ground, the driver turns by hand or moves with his foot a handle on a small winch, the barrel of which is marked W, and so winds up a wire cord or the like V, which in any suitable way, as by passing over a pulley X, Fig. 1, connects the said barrel with the part having the mouth B, as at X'. This connection might be made direct by a lever.

R shows a ratchet and pawl at each side of the spindle of the winch-barrel W, whereby the barrel is prevented from running back during or after winding up.

There are several points in which modifications of details might be made without departing from the spirit of this invention. For example, the closing of the door T of the box S may be assisted or accelerated by a spring.

It will be observed that the base of box S is rounded and that the door is located on one side of its pivot T' in such a manner that the door will close automatically by gravity as soon as the handle or lever U is released. Owing to the shape of the box-base the door will be easy to open, because it has not to sustain the whole weight of the box contents and because immediately it begins to open the weight it does sustain begins to diminish owing to the escape of the lowermost potatoes forming such weight. This arrangement of door also avoids undue friction of and damage to the potatoes. Instead of a roller O there might be a wheel or pair of wheels.

What I claim as new, and desire to secure by Letters Patent of the United States, is—

1. In a potato-digger, the combination with an inclined curved riddle having at its low front end a mouth with a share or cutting edge; a screw elevator within the same having a rounded entering edge, and at its discharge end gear, whereby the said screw will by turning of the traction-wheels of the machine be revolved; and means for adjustably supporting the front end of the riddle, substantially as described.

2. In a potato-digger the combination with an inclined curved riddle of a screw elevator within the same having an incurved rounded entering edge and at its discharge end bevel-gear operated by sprocket-and-chain mechanism whereby the said screw will by the turning of the traction-wheels of the machine be revolved so as to carry potatoes or the like up the riddle at a comparatively rapid rate, substantially as and for the purposes set forth.

3. In a potato-digger, the combination with a riddle, an elevating-screw having a rounded entering edge; gear for rotating said screw by the forward motion of the machine; and means for connecting and disconnecting said gear; of a roller mounted adjustably upon the front end of the riddle for supporting the latter, and means for lifting the front end of said riddle with said roller above the level of the ground, substantially as described.

4. In a potato-digger having an inclined curved riddle having an elevating-screw, having an incurved rounded entering edge, said screw being adapted to push potatoes up the said riddle and dirt and halms through the bars thereof, the combination therewith of a box or potato-receptacle S having a door T with pivot T' and connections U' to handle U whereby the door can be opened and the box emptied at will, and whereby the door of said box will close automatically when the lever or handle U is released substantially as set forth.

In testimony whereof I affix my signature in presence of two witnesses.

DAVID BUCHANAN.

Witnesses:
W. H. CUBLEY,
G. G. TURRI.